US009990474B2

(12) United States Patent
Shiraishi et al.

(10) Patent No.: US 9,990,474 B2
(45) Date of Patent: Jun. 5, 2018

(54) ACCESS CONTROL FOR SELECTED DOCUMENT CONTENTS USING DOCUMENT LAYERS AND ACCESS KEY SEQUENCE

(71) Applicant: KONICA MINOLTA LABORATORY U.S.A., INC., San Mateo, CA (US)

(72) Inventors: Kyohei Shiraishi, San Mateo, CA (US); Rabindra Pathak, San Jose, CA (US)

(73) Assignee: KONICA MINOLTA LABORATORY U.S.A., INC., San Mateo, CA (US)

(*) Notice: Subject to any disclaimer, the term of this patent is extended or adjusted under 35 U.S.C. 154(b) by 177 days.

(21) Appl. No.: 15/072,275

(22) Filed: Mar. 16, 2016

(65) Prior Publication Data

US 2017/0270283 A1    Sep. 21, 2017

(51) Int. Cl.
*G06F 21/10* (2013.01)
*G06F 21/60* (2013.01)
*G06F 21/62* (2013.01)
*H04L 29/06* (2006.01)
*H04L 9/32* (2006.01)

(52) U.S. Cl.
CPC ............ *G06F 21/10* (2013.01); *G06F 21/602* (2013.01); *G06F 21/6218* (2013.01); *H04L 9/3247* (2013.01); *H04L 63/061* (2013.01); *G06F 2221/0753* (2013.01)

(58) Field of Classification Search
CPC ................... G06F 21/10; G06F 21/602; G06F 2221/0746; H04L 63/061
See application file for complete search history.

(56) References Cited

U.S. PATENT DOCUMENTS 6,434,607 B1 * 8/2002 Haverstock ........... G06F 17/211
707/999.009
7,562,397 B1 * 7/2009 Mithal ............... G06Q 30/0235
705/52

(Continued)

FOREIGN PATENT DOCUMENTS

JP    2007-140958    6/2007
JP    2007-304775    11/2007

*Primary Examiner* — Eleni A Shiferaw
*Assistant Examiner* — Sher A Khan
(74) *Attorney, Agent, or Firm* — Chen Yoshimura LLP

(57) ABSTRACT

In a digital rights management system, layers are defined for each document and user permissions are specified for each layer, to control user access at the layer-level. The layers are ordered by depth, where a layer completely contained inside another layer is deemed deeper than the other layer. The layers are encrypted in a deep-to-shallow order, each by its own encryption key. The entire document is then encrypted. When a user requests access to a document, the system generates an ordered sequence of encryption keys based on the user's access rights for each layer. The document open program on the user's client computer attempts to decrypt the various layers using the ordered sequence of keys. The client program and the system's key sequence generating algorithm are designed to give the result that only layers that the user has access to are successfully decrypted and displayed at document open time.

14 Claims, 7 Drawing Sheets

(56) References Cited

U.S. PATENT DOCUMENTS

| | | | |
|---|---|---|---|
| 2002/0010679 A1* | 1/2002 | Felsher | G06F 19/328 705/51 |
| 2003/0002668 A1* | 1/2003 | Graunke | G06F 21/10 380/45 |
| 2005/0022122 A1* | 1/2005 | Barrus | H04N 1/2183 715/255 |
| 2005/0138109 A1* | 6/2005 | Redlich | G06F 17/30699 709/201 |
| 2006/0090082 A1* | 4/2006 | Apostolopoulos | G06F 21/10 713/189 |
| 2008/0016372 A1* | 1/2008 | Staddon | G06F 21/6209 713/189 |
| 2008/0310626 A1 | 12/2008 | Endoh | |
| 2009/0019516 A1* | 1/2009 | Hammoutene | G06F 21/6245 726/1 |
| 2010/0106954 A1* | 4/2010 | Muchsel | G06F 21/71 713/2 |
| 2010/0256994 A1* | 10/2010 | Eisenberger | G06Q 10/10 705/3 |
| 2012/0005720 A1* | 1/2012 | McGloin | G06F 21/6263 726/1 |
| 2013/0055359 A1* | 2/2013 | Sasaki | G06F 21/6218 726/4 |
| 2013/0218829 A1* | 8/2013 | Martinez | G06F 21/6272 707/608 |
| 2014/0130180 A1* | 5/2014 | Balasubramanyan | G06F 21/604 726/27 |
| 2017/0061146 A1* | 3/2017 | Lu | G06F 21/6218 |

* cited by examiner

| Layer ID | Document ID | Condition ID | Rendering Type | User Permissions | Encryption Key |
|---|---|---|---|---|---|
| L0 | D1 | C1 | Hide | U0, U1, U2, U3 | Key0 |
| L1 | D1 | C1 | Mask | U0, U1, U2, U3 | Key1 |
| L2 | D1 | C2 | Hide | U0, U1, U3 | Key2 |
| L3 | D1 | C3 | Mask | U0, U1, U2 | Key3 |
| L4 | D1 | C4 | Mask | U0, U2, U3 | Key4 |
| L0 | D2 | C1, C3 | Mask | U0, U1, U2, U3 | Key5 |
| L1 | D2 | C4 | Hide | U0, U1 | Key6 |
| ... ... | | | | | |

16A

ACCESS CONTROL FOR SELECTED DOCUMENT CONTENTS USING DOCUMENT LAYERS AND ACCESS KEY SEQUENCE

BACKGROUND OF THE INVENTION

Field of the Invention

This invention relates to document security and access control, and in particular, it relates to a method of access control of selected contents of a document.

Description of Related Art

Documents traditionally available only in hard copies are increasingly also available in digital copies. In fact many documents nowadays are prepared, generated, stored, distributed, accessed, read or otherwise used electronically in digital file formats such as the Portable Document Format (PDF™), Word™, PowerPoint™, Excel™, etc. With the wide use of digital documents and digital document processing, digital rights management systems ("DRM" or "RMS") are increasingly implemented to control user access and prevent unauthorized use of digital documents. The rights involved in using a digital document may include the right to view (or "read") the digital document, the right to edit (or "write") the digital document, the right to print the digital document in hard copies, the right to copy the digital document, etc. A user may access a digital document by acquiring (or being assigned) one or more of these rights.

DRM systems are generally implemented for managing users' rights to the digital documents stored in the systems. In a current DRM system, each digital document is associated with a rights management policy (or simply referred to as policy in this disclosure) that specifies which user has what rights to the document, as well as other parameters relating to access rights. Many such policies are stored in a DRM server (also called RMS server). The server stores a database table that associates each document (e.g. by a unique ID, referred to as document ID or license ID) with a policy (e.g. by policy ID). Each digital document may also have metadata that contains the document ID. When a user attempts to access a document (either a document residing on a server or a document that has been downloaded or copied to the user's computer) using an application program such as Adobe™ Reader, the application program contacts the DRM server to request permission. The DRM server determines whether the requesting user has the right to access the document in the attempted manner (view, edit, print, etc.), by determining the policy associated with the document and then referring to the content of that policy. The DRM server then transmits an appropriate reply to the application program to grant or deny the access. If access is granted, the server's reply may contain a decryption key to decrypt the document.

Two existing types of DRM systems are Adobe™ LiveCycle™ and Microsoft™ Active Directory™ Rights Management. Adobe LiveCycle supports a broader range of devices and operating systems which can utilize DRM protected PDF documents compared to other vendors. Microsoft Active Directory supports a broader range of devices and operating systems which can utilize DRM protected document of certain digital format such as Microsoft Office™ (Word, PowerPoint and Excel) documents compared to other vendors.

SUMMARY

In conventional DRM system described above, documents are protected at the document (file) level. The system encrypts a file, not individual parts of its content; therefore if a user is granted access to a document, she has access to all contents of the entire document. To allow different users to access different contents of a document, the DRM system would need to generate multiple encrypted versions (multiple files) of the document which would make different contents of the document visible, and grant different users access to different versions. These multiple versions would contain duplicative information, increasing the demand on system storage.

Moreover, it is often desirable to provide different contents of a document with different levels of security, but when the documents are encrypted only at the document level, if the access credential for a document is leaked or cracked, all information within the document will be exposed.

Accordingly, the present invention is directed to a digital rights management method and related apparatus that substantially obviates one or more of the problems due to limitations and disadvantages of the related art.

An object of the present invention is to provide a digital rights management method that can protect a document while making it possible to grant different users access rights to different contents of the document without creating multiple separate files for the document.

Another object of the present invention is to give the document publisher a way to apply additional security at content level by means of masking and/or hiding of blocks of content.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides, in a digital rights management system including a server connected to a client, an access authorization method executed by the server, which includes: (a) storing a document encryption key and document-level access control information for each of a plurality of documents, the document-level access control information specifying whether each of a plurality of users has access rights to the document; (b) storing layer-level access control information for each document, the layer-level access control information including, for each of a plurality of layers defined for the document, a layer identification (ID), a document identification (ID) identifying the document, user permission information specifying whether each user has access rights to content of the layer, and a layer encryption key for the layer; (c) receiving, from the client, a document access request by a requesting user to access a requested document identified by a document ID; (d) based on the document-level access control information, determining whether the requesting user has access rights to the requested document; (e) if in step (d) it is determined that the requesting user does not have access rights to the requested document, transmitting a first reply to the client which denies access to the requested document; and (f) if in step (d) it is determined that the requesting user has access rights to the requested document, (f1) retrieving the layer-level access control information for the requested document; (f2) generating sequence information that represents an ordered sequence of the layer encryption keys or layer IDs, the ordered sequence being uniquely determined by the access rights of the requesting user to access each layer; and (f3) transmitting a second reply to the client which includes the sequence information, the layer encryption key for each layer, the layer ID associated with each layer encryption key, and the document encryption key for the document.

In one embodiment, the plurality of layers form a depth sequence based on depths of the layers where any layer that is completely contained in another layer is deemed deeper than the other layer, the depth sequence being ordered from shallower layers to deeper layers, wherein step (f2) includes: setting a sequence of the encryption keys or layer IDs to an initial sequence which corresponds to the depth sequence of the layers; sequentially evaluating the layers according to the depth sequence while manipulating positions of the encryption keys or layer IDs in the sequence of the encryption keys or layer IDs, including, for each layer, if the user has access rights to the layer, keeping a position of the corresponding encryption key or layer ID in the sequence, and if the user has no access rights to the layer, changing the position of the corresponding encryption key or layer ID in the sequence.

In another aspect, the invention provides, in a digital rights management system including a server connected to a client, an access authorization method executed by the client for processing an encrypted document for display, which includes: (a) obtaining the document, the document having been encrypted with a document encryption key, the document containing a plurality of layers each containing defined content of the document, each layer having been encrypted by a layer encryption key and identified by a layer identification (ID), wherein for any layer that is completely contained in another layer, encrypted data of the contained layer and other content of the containing layer have been further encrypted to form encrypted data of the containing layer; (b) transmitting a document access request to the server, which includes a user identification (ID) of a user and a document identification (ID) for the document; (c) receiving from the server a reply containing sequence information that represents an ordered sequence of the layer encryption keys, a layer ID corresponding to each layer encryption key, and the document encryption key; (d) decrypting the document using the document encryption key to generated decrypted document data which contains unencrypted document content and further contains encrypted data of one or more layers, the encrypted data of each such layer being associated with a tag containing the corresponding layer ID; (e) decrypting at least some of the plurality of layers of the document using the ordered sequence of the layer encryption keys, wherein each layer encryption key in the order sequence is used once and only once according to the sequence to attempt to decrypt encrypted layers that are currently available for decryption, wherein when an encrypted layer is successfully decrypted, the data generated by such decryption contains unencrypted document content of that layer and further contains encrypted data of zero or more other layers, the encrypted data of each of the other layer being associated with a tag containing the corresponding layer ID, and when after all layer encryption keys in the order sequence are used once and only once, at least one of the layers remain encrypted; and (f) displaying the document based on decrypted data generated in steps (d) and (e), wherein document content of any of the layers that remain encrypted after step (e) is not displayed.

In another aspect, the present invention provides a computer program product comprising a computer usable non-transitory medium (e.g. memory or storage device) having a computer readable program code embedded therein for controlling a data processing apparatus (server or client), the computer readable program code configured to cause the data processing apparatus to execute the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method to allow different user access permissions to different contents of a document in addition to the existing DRM protection of the entire document. If a particular user does not have permission to view a particular content of the document, then when the document is opened by the user, that part will be hidden or masked while other contents will be visible to the user. Contents of a document may be pages, paragraphs or sentences of text, images, fields, etc. In embodiments of the invention, document layers are defined for selected contents of the document, and the control of whether a user is allowed to view the content of the layers is referred to as layer-level access control. The document layers described here are not to be confused with the "layers" of a PDF document.

Figure 1:
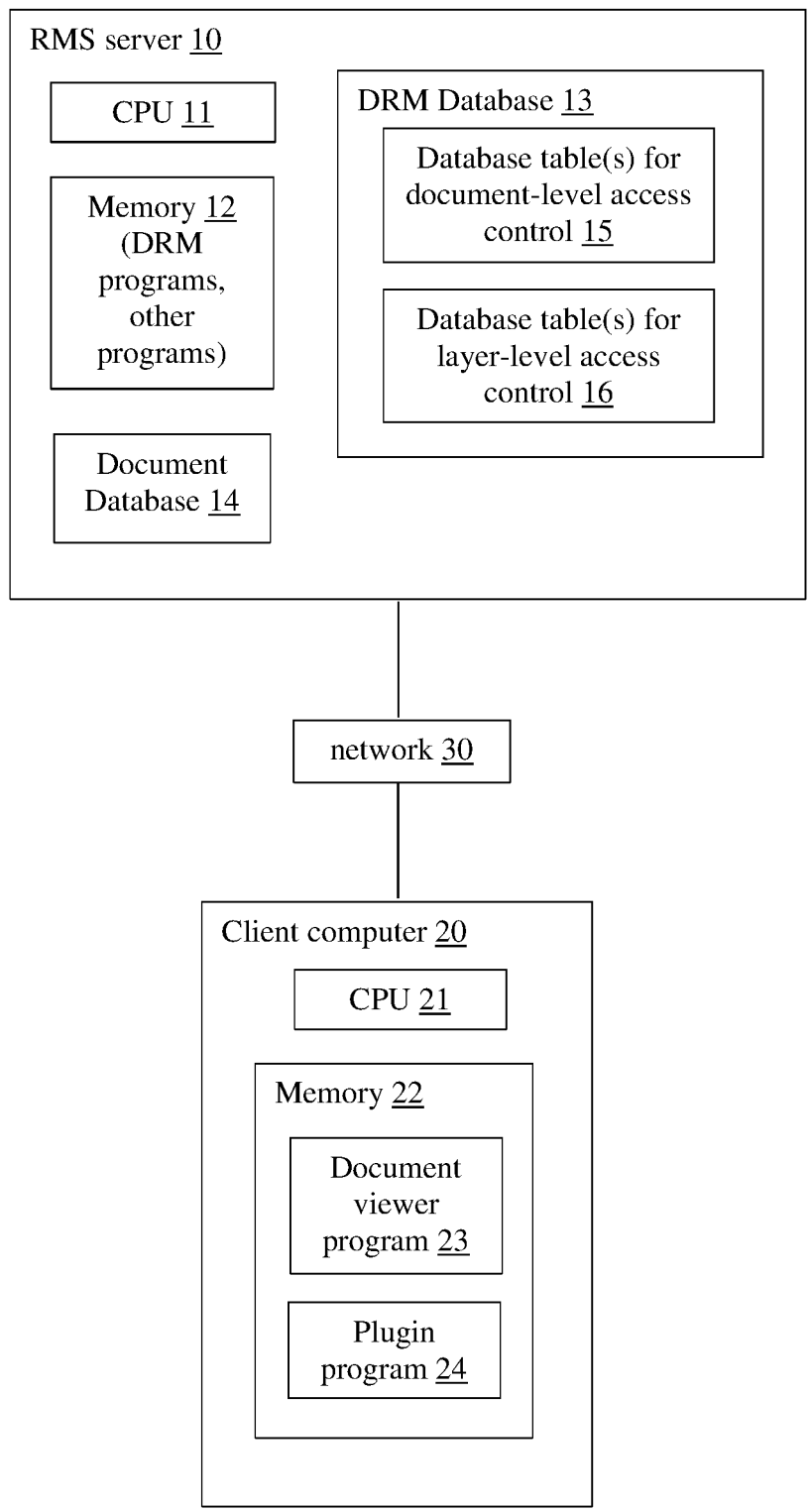
FIG. 1 schematically illustrates a digital rights management (DRM) system including a rights management server (RMS server) and a client according to embodiments of the present invention.

FIG. 1 schematically illustrates a digital rights management (DRM) system that includes a digital rights management server (RMS server) 10 connected via a network 30 to one or more client devices 20 such as client computers, tablets, smart phones, etc. The client devices 20 are devices used by users to interact with the RMS server 10 to gain access to protected documents or to register (also referred to as publish) documents in the DRM system.

The RMS server 10 includes hardware such as a CPU 11 for executing DRM programs stored in a memory 12 to perform various DRM functions, including a document registration module that performs a document registration process and an access authorization module that perform an access authorization process described later. The RMS server 10 maintains a DRM database 13 which contains various DRM database tables used to control access to documents. The RMS server 10 also maintains a document database 14 which stores copies of the digital documents managed by the system (referred to as protected documents).

The DRM database 13 includes one or more database tables 15 used to control access at the document level, i.e., whether a user is to be granted access to a particular document in the first place, before applying layer-level access control. The document-level access control database tables 15 may include, for example, a DRM policy table containing a number of rights management policies which describe which users have access permission under each policy, and a document-policy association table that associates each document to a policy, or a document-user permission table that lists the permitted users for each document, etc. Other suitable manners of organizing document-level access control information may be used. The DRM database 13 further includes various database tables 16 used to control access at the layer-level, beyond the document-level access control, as will be described in detail later.

The client device 20 includes a CPU 21 for executing various programs stored in memory 22 to perform various DRM functions, including the document registration process and access authorization process described later. The program may include plugin programs 24 for a document viewer or editor program 23 such as Adobe™ Acrobat™ Pro, Microsoft™ Word, or other Microsoft™ Office programs, etc. One plugin may perform a document registration process and another plugin may perform an access authorization process.

To enable selective access control for a document, when publishing a document in the DRM system, the publisher of the document defines one or more document layers and specifies user access permissions for each layer. Each document layer contains some contents of the document, such as pages, paragraphs or sentences of text, images, fields, etc. The size of a document layer is not limited, and a layer can also be empty.

Each document layer has the following properties: layer ID, rendering type, condition ID, and user permissions. The layer ID is a unique identifier within the document that identifies each layer. The rendering type indicates the display behavior of the layer when a user does not have permission to view the content of the layer, and its value is either "hide" (the content is invisible, and the space that would be occupied by the content is blank) or "mask" (the content is replaced by a mask such as a black block, black stripes, lines of "X" marks, etc.). The rendering type property increases the flexibility of the method, but it is optional; when it is not used, all contents that are not to be displayed to a user can be hidden or masked. The condition ID is a reference to pre-stored conditions, such as location or date/time, to be dynamically evaluated when opening the document in order to determine whether the content of the layer should be displayed. Conditions are optional. User permissions define which users will be given access to each document layer. The permissions may be specified in various forms, such as a list of users, a list of predefined user groups, a reference to a rights management policy which contains a list of permitted users, etc.

Multiple layers in a document may have nesting relationships, i.e., the document content of one layer may be completely contained in (nested in) another layer. However, any two layers are not allowed to partially overlap, e.g., the two layers are not allowed to contain some common content while each layer also containing content not contained in the other layer. The document registration program may implement a logic to recognize when the publisher attempts to define two partially overlapping layers and to display a message to request the publisher to correct it.

Figures 2, 3:
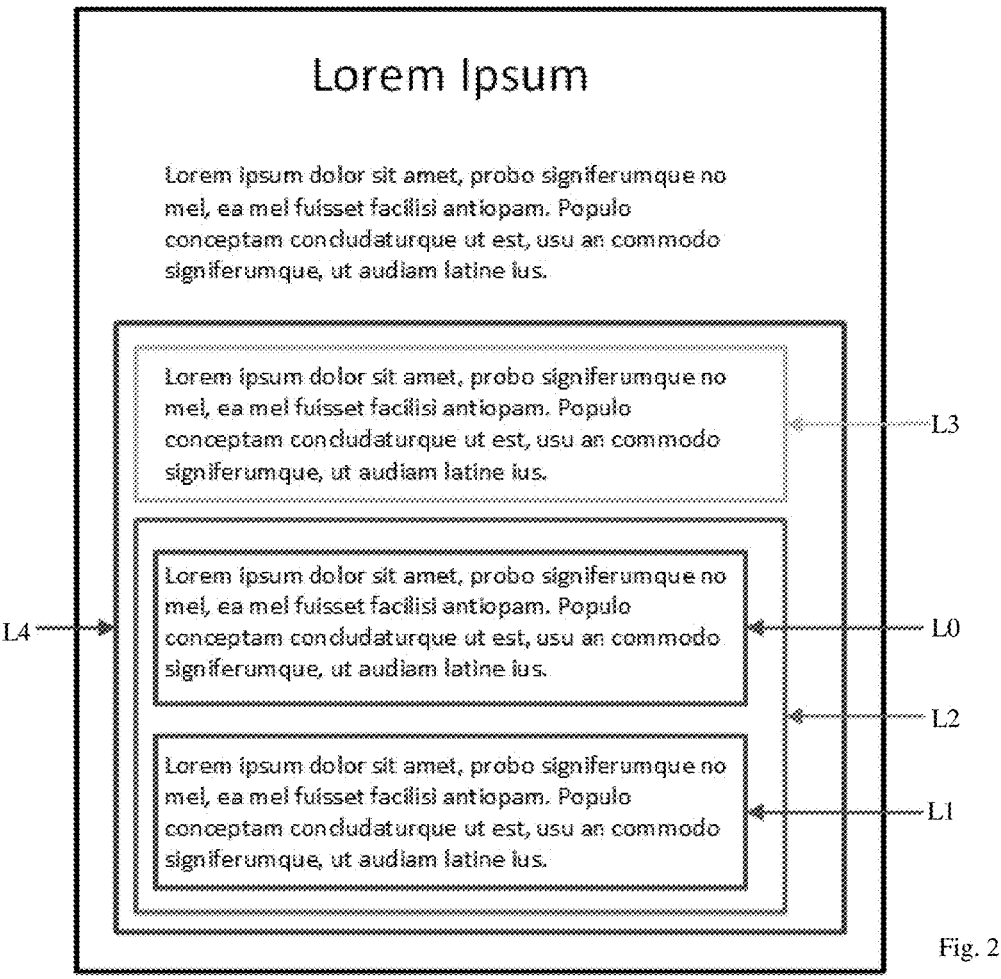
FIG. 2 schematically illustrates an example of a page of document for which multiple layers are defined, where access to the layers can be controlled individually, according to an embodiment of the present invention.
FIG. 3 schematically illustrates a document layer database table for storing properties of layer defined for documents according to an embodiment of the present invention.

After the publisher defines the layers, the document registration program of the server determines a depth sequence of the multiple layers taking into account their nesting relationships (if any), such that a smaller layer that is completely contained in a larger layer is considered deeper than the larger layer. The relative depths of two layers that do not overlap each other can be arbitrary. In a preferred embodiment, the document registration program assigns layer IDs to the layers in accordance with their depths, so that deeper layers are given lower layer ID numbers. In this case, the layer ID functions as a depth index. In an alternative embodiment, a separate layer depth index may be assigned to the layers. FIG. 2 schematically illustrates an example of a page of document for which five layers are defined, namely, layer L0 to layer L4. The outer border in FIG. 2 represents the document page. In this example, layer L2 completely contains layer L0 and layer L1; layer L4 completely contains layer L2 and layer L3. Layer L1 is completely contained inside both layer L2 and layer L4. In this example, the layer IDs reflect the layer depths.

Each document layer is encrypted by its own encryption key, which are different from each other. When a smaller layer is contained in a larger layer, the smaller layer (the contained layer) is encrypted first, and the encryption step of the larger layer (the containing layer) encrypts the already encrypted data of the smaller layer. This can be ensured by performing encryption according to the depths of the layers, in a deep-to-shallow order starting from the deepest layer. The encrypted data of each layer is tagged with its layer ID. As will become clear later, this also means that in the decryption process, the layers need to be decrypted in a shallow-to-deep order starting from the shallowest layer.

The layer-level access control information, including properties of the layers and the encryption keys, are stored in a document layer database table 16A on the server 10, an example of which is shown in FIG. 3. As shown in FIG. 3, each entry of the database table 16A is for a document layer, and includes the following fields: layer ID, document ID (which identifies the document that the layer belongs to), condition ID, rendering type, user permissions, and encryption key. The "user permissions" may use any suitable format; in the illustrated example, the permissions are defined by listing the users that will be granted access permission to each layer. By including the document ID in the table, the layers of multiple documents can be stored in the same data database table and the layer IDs only need to be unique within each document and do not have be globally unique in the DRM system.

The document layer database table 16A is a part of the layer-level access control database 16. The format of the layer-level access control database 16 is flexible. In alternative implementations, the information shown in the exemplary table 16A in FIG. 3 may be stored in multiple tables; for example, the encryption keys may be stored in a separate table that contains the keys, a key ID for each key, and the layer ID corresponding to each key. In the database table 16A shown in FIG. 2, the layer ID can also be used as a reference for the encryption keys since there is a one-to-one relationship between the layers and the keys.

The encryption keys for the document layers are specific to the document, not the users. The display behavior (e.g., show, hide, or mask) of the layers of a particular document when opened by a particular user is determined at the time of opening the document. According to an embodiment of the present invention, when a user requests to open a document, the access authorization program on the RMS server generates an ordered sequence of the encryption keys for the document being requested (the requested document), the key sequence being specific to the user who is requesting access (the requesting user) based on the access permissions that the user is granted to each document layer; the access authorization program on the user's client computer determines the behavior of the document layers based on the ordered sequence of keys provided by the server.

This technique allows the server to control the display behavior of the document by changing the ordered sequence of keys provided to the client computer based on users' access permissions. Preferably, the server generates the key sequence in response to receiving a request from a user to open a document; therefore, it is not necessary to pre-store an ordered sequence of keys for each user in the DRM database.

Figure 4:
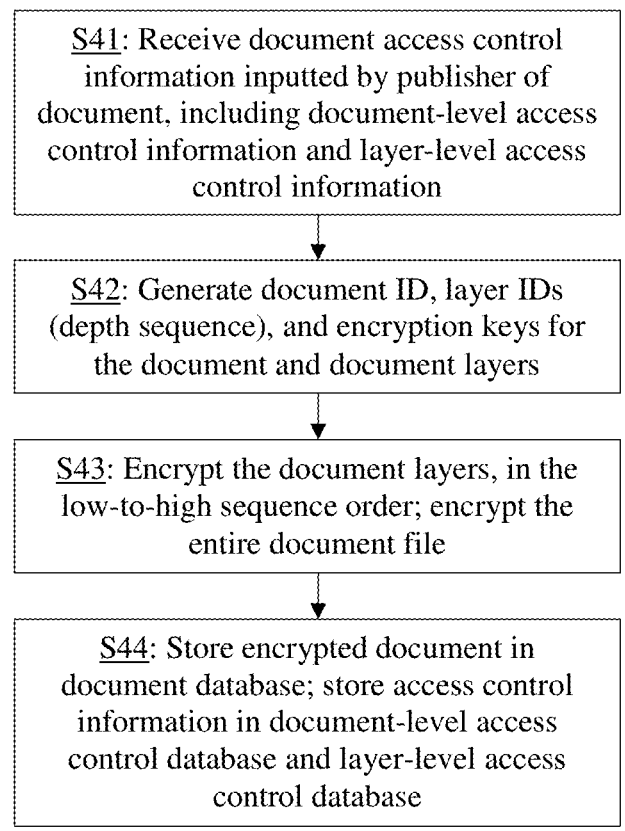
FIG. 4 schematically illustrates a process of registering a document in the DRM system according to an embodiment of the present invention.

FIG. 4 schematically summarizes a process of registering a document in the DRM system according to an embodiment of the present invention. In step S41, the publisher of a document inputs various information related to access control for the document, including document-level access control information (user permissions for the document) and layer-level access control information including the following for each layer: the content description (what content is included in the layer), conditions, rendering type, and user permission.

In one implementation, step S41 is performed by the document registration plugin program on the client 20. A graphical user interface (GUI) may be implemented to allow the publisher to conveniently input the required information. The client 20 then transfers the user inputted information to the server 10 which performs the subsequent steps. From the standpoint of the RMS server 10, step S41 may be viewed as a step of receiving the above-mentioned document-level access control information and layer-level access control information from the client 20.

After receiving the information, the document registration program on the server generates a document ID for the document, layer IDs, and encryption keys for the document layers (step S42). As mentioned earlier, the layer IDs may be assigned in accordance with layer depths that are determined by taking into account the nesting relationship of the layers. The server then encrypts the document layers, in the deep-to-shallow order as described earlier, using the corresponding encryption keys for the layers, and then encrypts the entire documents file using the encryption key for the document (step S43). As mentioned earlier, when a deeper layer is nested inside a shallower layer, the encryption step of the shallower layer will encrypt already-encrypted data of the deeper layer. Tags may be used to indicate that, of the data to be encrypted in a particular layer, a block of data is encrypted data of a deeper layer having a certain layer ID.

The server stores the encrypted document in the document database 14, and stores the access control information in the document-level access control database 15 and the layer-level access control database 16 (step S44).

Alternatively, steps S42 and S43 or parts thereof may be performed by the client 20 and the result may be transferred to the server. Any suitable way of distributing the workload between the client and server may be employed and the communication between the two may be arranged correspondingly.

Figure 5:
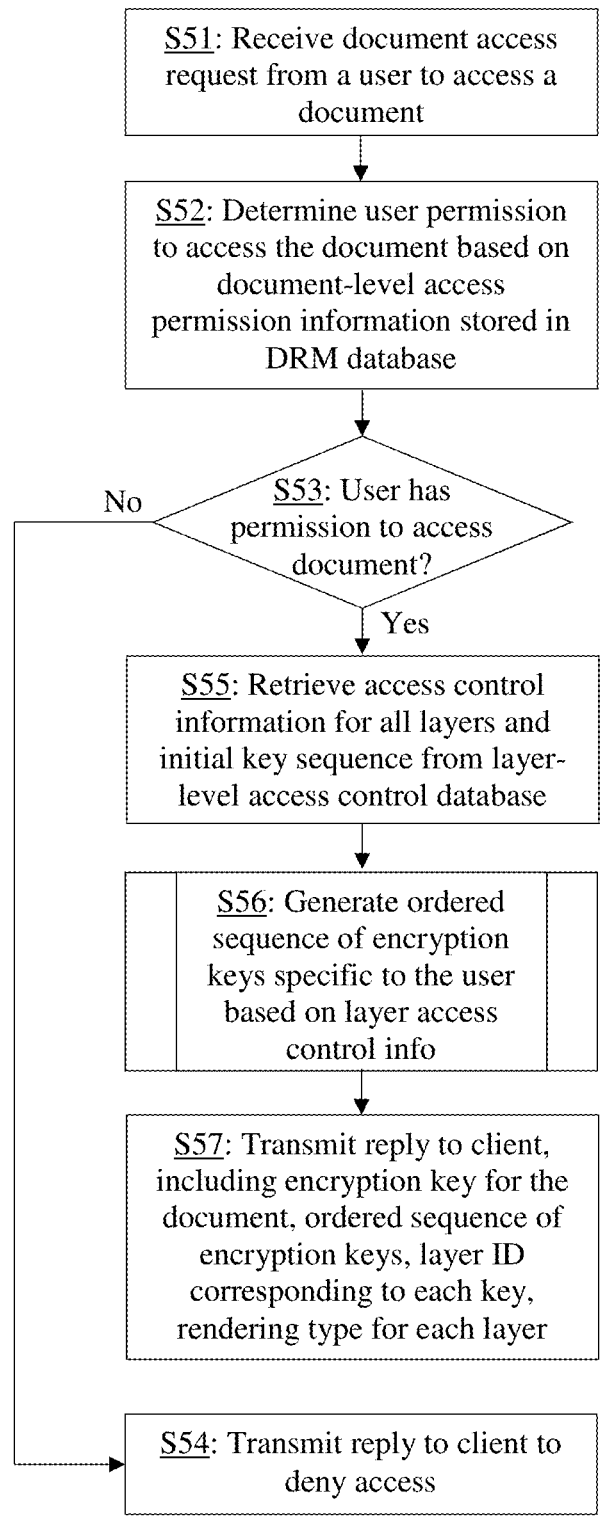
FIGS. 5 and 6 schematically illustrate an access authorization processes executed by the RMS server according to an embodiment of the present invention.
Figure 6:
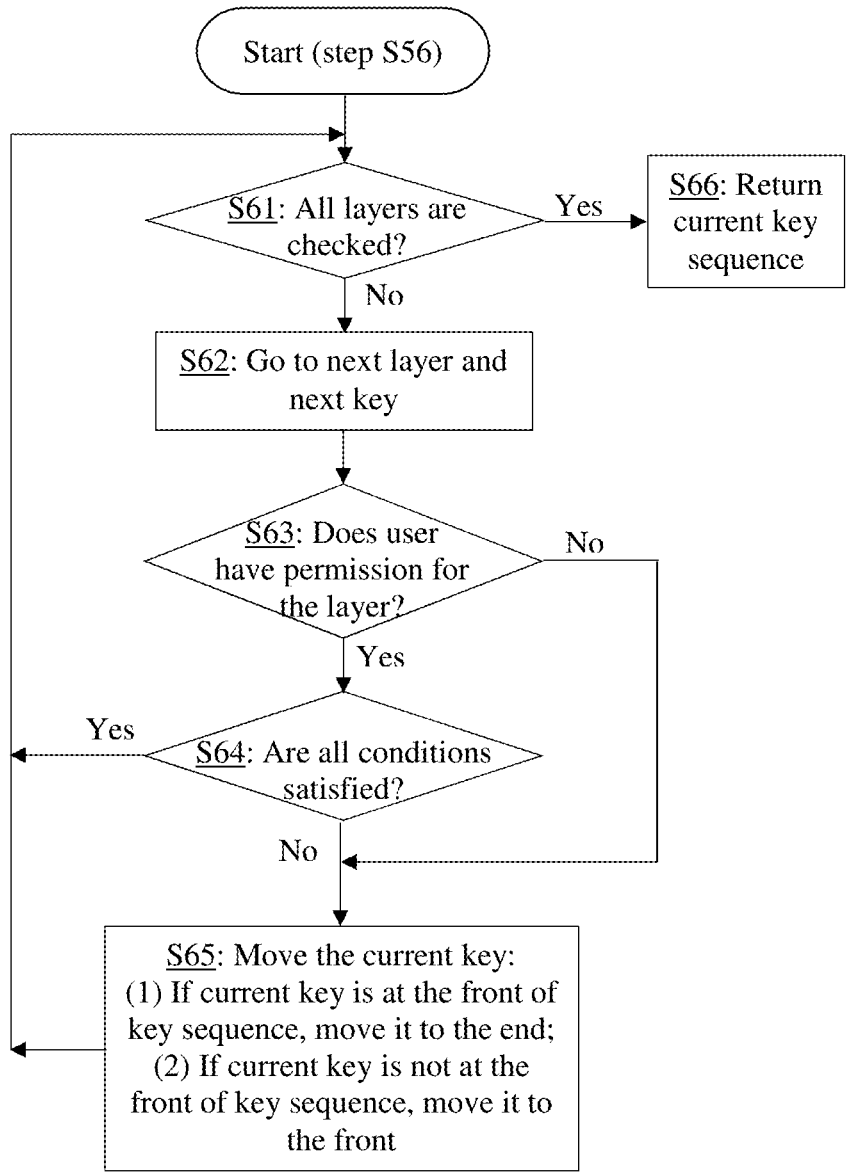
Figure 7:
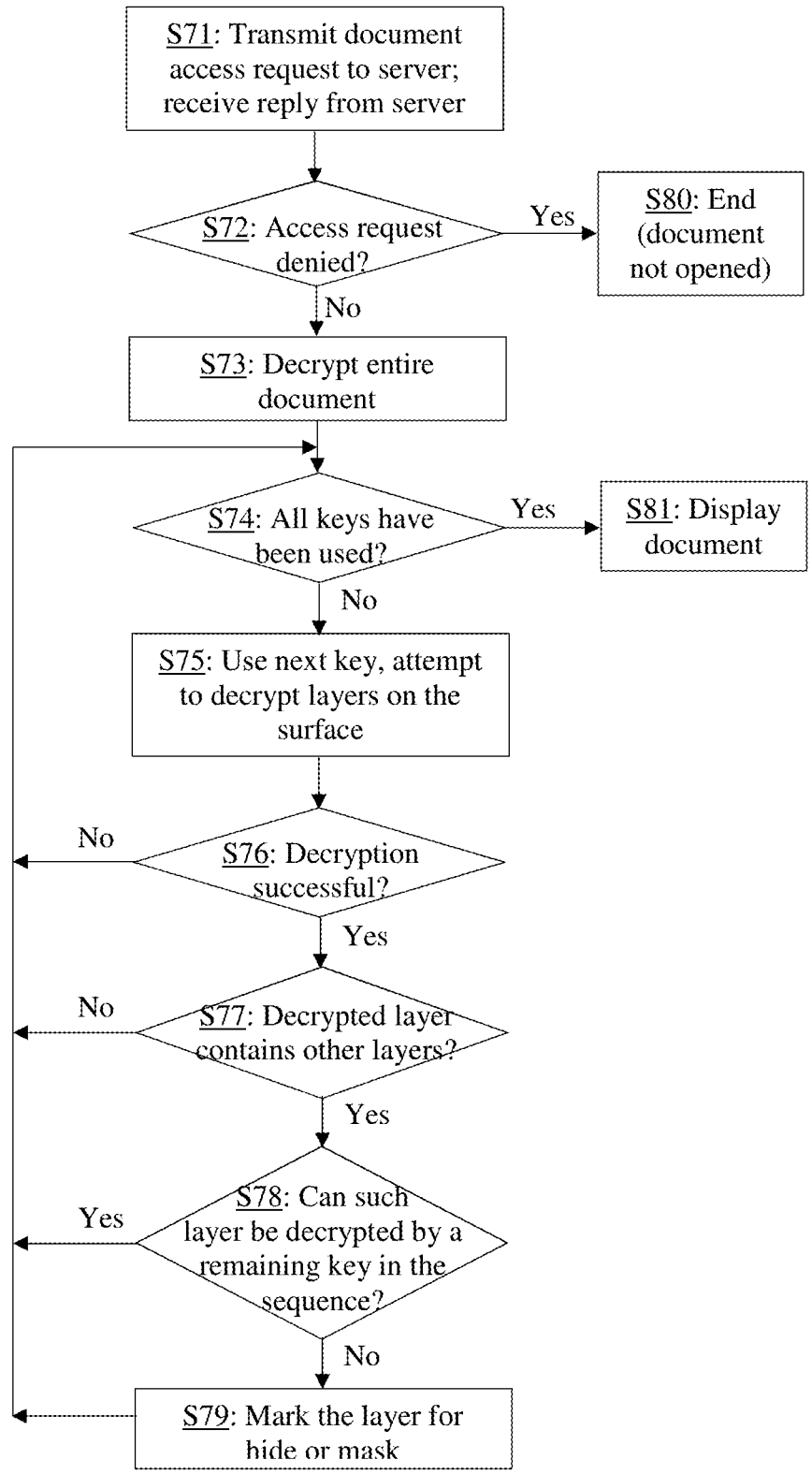
FIG. 7 schematically illustrates an access authorization processes executed by the client computer according to an embodiment of the present invention.

FIGS. 5-7 schematically illustrate an access authorization processes executed by the server 10 and client 20 when a user requests access to a document. The process shown in FIG. 5 is executed by the server, and FIG. 6 illustrates step S56 of FIG. 5 in detail. The process shown in FIG. 7 is executed by the client. Note that the client 20 that performs the access authorization process may be different from the client that participated in the document registration process.

As shown in FIG. 5, in step S51, the server receives a document access request from the client 20 which includes a user ID identifying the requesting user and a document ID identifying the requested document. The document access request may also contain an IP address of the client computer and a time stamp. The server first determines, based on document-level access permission information stored in the DRM database tables 15, whether the user has permission to access the document (step S52). This may be done, for example, by first obtaining the rights management policy associated with the document ID from the document-policy association table, and then checking the policy contained in the policy table to determine whether the requesting user has access permission. Other suitable methods of determining document-level access permission may also be used. If the user does not have permission to access the document ("No" in step S53), the server transmits a reply to the client to deny the document access request (step S54). As a result, the client cannot open the document.

If the user does have permission to access the document ("Yes" in step S53), the server retrieves, from the layer-level access control database 16, layer-level access control information for the requested document, including whether the requesting user has permission to access each layer, and an initial sequence of the encryption keys (step S55). The initial sequence of the keys is the same as the layer depth sequence (shallow to deep), which was assigned in step S42 when the document was registered in the DRM system. The server then manipulates the initial sequence of keys to generate an ordered sequence of the keys that is specific to the requesting user, based on the user permissions for the layers (step S56). The server transmits a reply to the client which includes the ordered sequence of the encryption keys along with the layer ID corresponding to each key (step S57). The reply also includes the encryption key for the entire document, and the rendering type for each layer.

Note that because of the one-to-one correspondence between the layer ID and encryption keys, the ordered sequence transmitted to the client may be in the form of an ordered sequence of layer IDs, along with the keys themselves (in any order) and a table that specifies the key-layer ID correspondence. More generally, the reply includes information in any suitable form that represents an ordered sequence of the keys.

The algorithm for arranging the order of keys to generate the ordered sequence of keys (step S56) is described with reference to FIG. 6. When the process starts, the current key sequence is the initial key sequence, which is ordered in a shallow-to-deep order of the layers; in the illustrated example, it is Key4→Key3→Key2→Key1→Key0. The process checks each layer according to the layer depth sequence starting from the shallowest layer, and manipulates the sequence position of each key starting from the key at the front of the key sequence.

In step S61, the process determines whether all document layers are checked. If not ("No" in step S61), the process goes to evaluate the next layer and the next key in the key sequence (step S62). The first time step S61 is executed, the next layer is the shallowest layer and the next key is the first key in the initial sequence.

The process evaluates whether the user has permission to access this layer (step S63). If the user has permission ("Yes" in step S63), it is further determined whether the conditions (if any) for that layer are satisfied (step S64). For example, if a condition "time of day is between 9 am and 5 pm" is defined for the layer, then the condition is evaluated against the current time (or a time stamp in the document access request). This step includes first obtaining the condition IDs and then retrieving the conditions from a condition table (a part of the layer-level access control database 16) based on the condition ID. It is also possible to directly store the conditions in the document layer database table 16A (FIG. 3). As mentioned earlier, the implementation of condition checking is optional.

If the conditions are satisfied ("Yes" in step S64), i.e. the user has permission to access this layer and the conditions (if any) are satisfied, the process returns to step S61 to check the next layer and the next key, without changing the key sequence.

If either the user does not have permission to access this layer ("No" in step S63) or some conditions are not satisfied ("No" in step S64), the current key in the sequence is moved in the following manner (step S65): (1) If the current key is at the front of the key sequence (the first key in the sequence), the key is moved to the end of the key sequence. (2) If the current key is not at the front of the key sequence, the key is moved to the front of the key sequence. The process then returns to step S61 to check the next layer and the next key.

In an alternative embodiment, in step S65, if the current key is at the front of the key sequence, the key is removed from the key sequence (rather than moved to the end). As a result, the key sequences generated in this process may become shorter than the initial key sequence.

Once all layers are checked ("Yes" in step S61), the process terminates and returns the current key sequence (step S65).

The result of the process of FIG. 6 is that when the user has access to all layers and all conditions are satisfied, the ordered sequence of keys remains the same as the initial sequence; but when the user does not have access to all the layers or some conditions are not satisfied, the order sequence of keys is different form the initial sequence. When two users have different access rights (assuming all conditions are satisfied), the resulting order sequences of keys will be different.

FIG. 7 illustrates an access authorization (i.e. document open) process executed by the client when the user requests to access a protected document. The protected document is one that has been distributed to the user after it is encrypted by the server using the process of FIG. 4, so it contains layers of encrypted data that have been encrypted in the deep-to-shallow order. The access authorization process attempts to decrypt the layers one by one in accordance with the depth sequence of the layers, starting from the shallowest layer, using the encryption keys one by one (each key is used once and only once) according to the keys sequence received from the server. Because of the way the sequence of keys is ordered, which was generated by the server specifically for the user based on the user's access right (see step S56), the decryption process will reveal the contents of the document in the way consistent with the user access rights stored in the document layer database table 16A.

In step S71, the document open program transmits a document access request to the server, and receives a reply from the server. The document access request contains the user ID and document ID as described earlier. The reply contains either a denial of access, or decryption information including an ordered sequence of encryption keys, the layer ID corresponding to each key, the rendering type for each layer, and the key for the entire document (see step S57).

If the reply is a denial of access ("Yes" in step S72), the document is not opened and the process ends (step S80).

Otherwise ("No" in step S72), the document open program first decrypts the entire document (step S73). The decrypted data will contain zero or more deeper layers of encrypted content (with tags indicating the layer IDs as described earlier), as well as unencrypted contents. The unencrypted contents after the entire document is first decrypted are contents that are not covered by any document layers (i.e. no additional encryption is applied for them); they may be referred to as the base layer of the document. At any given point of the document open process, the layers of encrypted data that are obtained after all layers that contain them have been decrypted are referred to as being "on the surface", i.e., they are available for decryption at that point. For example, in the example illustrated in FIG. 2, after the entire document is first decrypted, layer L4 will be on the surface; after layer L4 is decrypted, layers L3 and L2 will be on the surface; and if at that point layer L2 is decrypted, then layers L3, L0 and L1 will be on the surface.

The document open program next determines whether all keys in the sequence of keys have been used (step S74). A queue may be used for this purpose, where the keys are stored in the queue in the specified order and popped from the top one by one. If not all keys have been used ("No" in step S74), the next key in the sequence of keys is taken as the current key and used to attempt to decrypt the layers on the surface at this point (step S75). As described earlier, the encrypted data for each layer is tagged with the layer ID. Thus, step S75 is carried out by comparing the layer ID corresponding to the current key (this layer ID information is received in the reply from the server) with the layer IDs in the tags of the layers on the surface to determine which (if any) layer on the surface can be decrypted by the current key, and performing decryption accordingly. Depending on how the keys have been ordered by the server, the attempted decryption will be unsuccessful (i.e. the current key cannot decrypt any of the layers on the surface) or successful (i.e. the key can decrypt one (and only one) of the layers on the surface).

If decryption is unsuccessful ("No" in step S76), the process returns to step S74 to try the next key in the sequence.

If decryption is successful ("Yes" in step S76), it is determined whether the just decrypted layer contains other (deeper) encrypted layers (step S77). If it does not ("No" in step S77), the process returns to step S74 to use the next key in the sequence to try to decrypt another layer on the surface.

If the just decrypted layer does contain other (deeper) encrypted layers ("Yes" in step S77), it is determined whether any of the remaining keys in the key sequence will successfully decrypt the deeper layers (step S78). Again, this is carried out by comparing the layer IDs corresponding to the remaining keys with the layer IDs in the tags of the deeper layers in question. This determination is made for each of the deeper layers. If the determination for a deeper layer is negative (i.e. it cannot be decrypted by any of the remaining keys in the sequence) ("No" in step S78), this layer is marked as to be hidden or masked depending on the rendering type parameter for this layer (this information is received from the server in the reply) (step S79). The process then returns to step S74 to try the next key in the sequence.

Note that when rendering a layer as hidden or masked, it may be desirable to render a white space or masking marks (black stripes, X marks, etc.) that occupy the same amount of space as the actual content. To this end, information regarding the length and/or location (e.g., location of an image object) of the content may be provided in the tag of the encrypted layer and is used in the rendering process to achieve desired hidden/masked effect.

If the determination for a deeper layer is affirmative (i.e. it can be decrypted by one of the remaining keys in the sequence) ("Yes" in step S78), the process returns to step S74 to try the next key in the sequence. No decryption is actually performed for this layer at this time (decryption may occur later). Note also that the determination in step S78 does not advance the designation of the "current key"— only step S75 advances to the next key in the sequence.

In step S74, after all keys in the key sequence are used ("Yes" in step S74), the document is displayed, where the decrypted contents are shown, and the contents that are marked as "hide" or "mask" in step S79 are hidden or masked accordingly (step S81). In this step, any layer that is not visited before all keys are used up will not be displayed and will be treated as hidden or masked.

In an alternative embodiment, steps S78 and S79 are omitted; rather, the process merely uses the next key to attempt to decrypt the layers currently on the surface (step S75), and after all keys are used, the layers that are successfully decrypted are displayed and any layer that is not successfully decrypted is not displayed (i.e. rendered as hidden or masked).

It can be seen that while the order sequence of keys contains all of the keys that have been used to encrypt the plurality of layers, due to the particular order of the sequence of the keys received by the client, some layers may remain encrypted after all the keys are used once.

It is noted that the algorithm for generating the ordered sequence of encryption keys (FIG. 6) and the algorithm for decrypting the layers during document open (FIG. 7) are designed such that a user will be allowed to view a content only if the user is given access permissions (by the publisher) to all layers that contain that content. For example, in the example of FIG. 2, in order to view the content of layer L0, a user must be given permission for layers L0, L2 and L4. In the example of user permissions shown in FIG. 3, user U1 is given permission for layers L0, L1, L2 and L3 but not for L4, so the result will be that user U1 cannot view layers L0, L1, L2 and L3 because they are all contained within layer L4. Such a result may be inconsistent with the publisher's original intent regarding user U1. In a preferred embodiment, the document registration program on the client, which interacts with the publisher to input access control information (step S41), can implement a logic that detects this type of inconsistent user permissions, and displays a warning message to the publisher so that the publisher may correct them, such as by giving user U1 permission for layer L4.

The examples of user permissions shown in FIG. 3 will result in the follows ordered key sequences for the various users:

For user U0: 4→3→2→1→0
For user U1: 3→2→1→0→4
For user U2: 2→4→3→1→0
For user U3: 3→4→2→1→0

Figure 8:
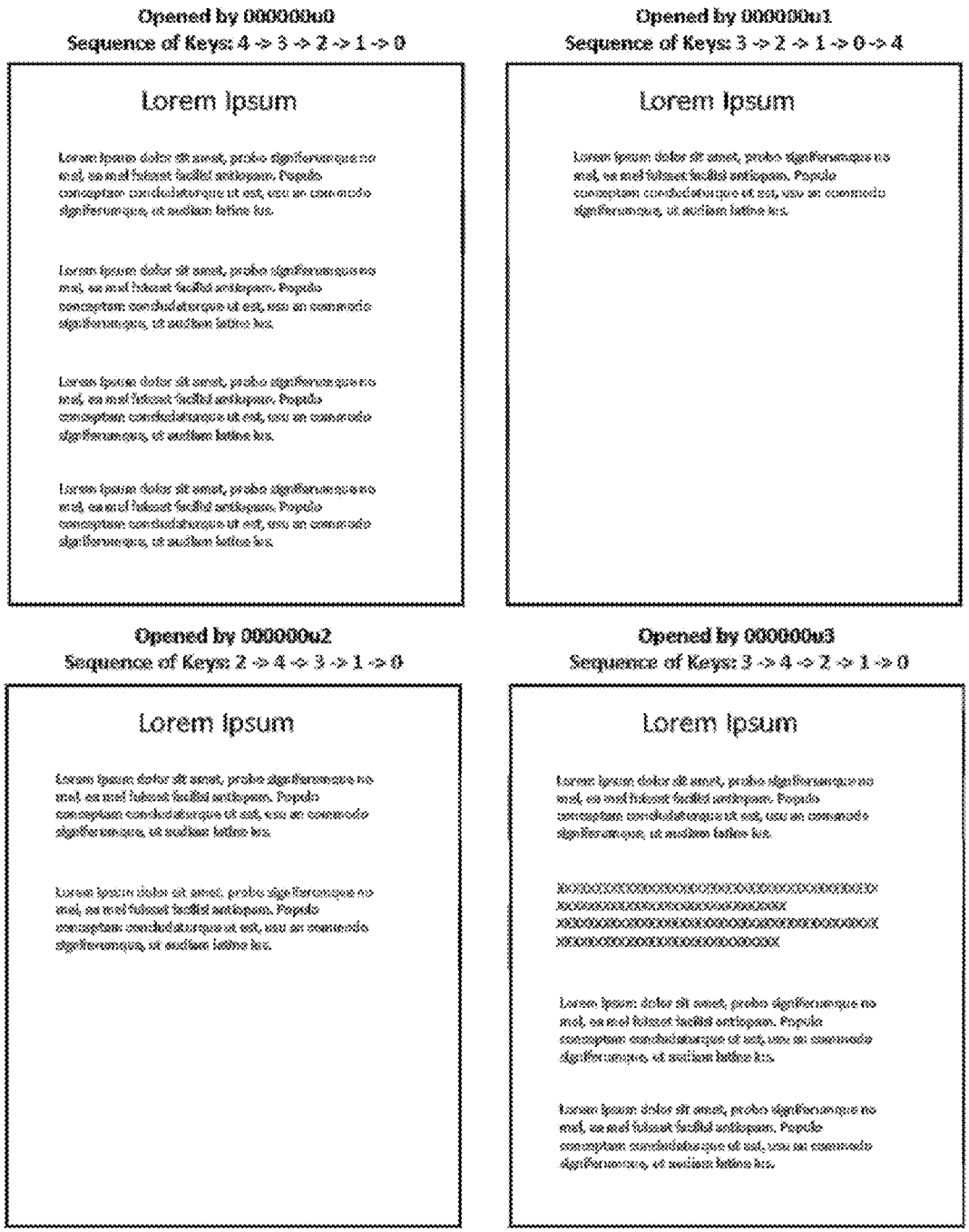
FIG. 8 schematically illustrates the results of the displayed page for different users in the example shown in FIGS. 2 and 3.

The results of the displayed page for the various users are shown in FIG. 8.

An alternative embodiment is described below.

While encryption of individual layers provides enhanced security to document and its contents, it increases the overall time of rendering before the document becomes readable, as iteration of decryption is time consuming. According to the alternative embodiment, layer-level access control can be accomplished without degrading the overall rendering performance, by removing encryption and decryption for the layers. The processes are similar to those described earlier (FIGS. 3-7), with the following changes: (1) The layers are not encrypted at the document registration stage (step S43), and accordingly, the document layer database table 16A no longer contains the encryption keys. (2) The layer ID continues to function as a layer depth index, and the RMS server generates an ordered sequence of layer IDs instead of a sequence of keys in step S56, using the same algorithm described above. Alternatively, a separate layer depth index parameter may be used with an equivalent effect. (3) In the document open process executed by the client (FIG. 7), the ordered sequence of keys is replaced by the ordered sequence of layer IDs (or alternatively, an ordered sequence of the layer depth index parameters along with a layer ID-depth index correspondence table), and in step S75, the layer IDs are compared as described earlier but no decryption is necessary; a "successful" result in step S76 means that the layer content (excluding any content covered by a deeper layer) will be shown. The same result is achieved as in the embodiment of FIGS. 3-7.

It will be apparent to those skilled in the art that various modification and variations can be made in the layer-level access control method and related apparatus of the present invention without departing from the spirit or scope of the invention. Thus, it is intended that the present invention cover modifications and variations that come within the scope of the appended claims and their equivalents.

What is claimed is:

1. In a digital rights management system including a server connected to a client, an access authorization method executed by the server, comprising:
    (a) storing a document encryption key and document-level access control information for each of a plurality of documents, the document-level access control information specifying whether each of a plurality of users has access rights to the document;
    (b) storing layer-level access control information for each document, the layer-level access control information including, for each of a plurality of layers defined for the document, a layer identification (ID), a document identification (ID) identifying the document, user permission information specifying whether each user has access rights to content of the layer, and a layer encryption key for the layer;
    (c) receiving, from the client, a document access request by a requesting user to access a requested document identified by a document ID;
    (d) retrieving the layer-level access control information for the requested document;
    (e) generating sequence information that represents an ordered sequence of the layer encryption keys or layer IDs, the ordered sequence containing one copy of the layer encryption key or layer ID for each layer and arranged in an order that is uniquely determined by the access rights of the requesting user to access each layer; and
    (f) transmitting a second reply to the client which includes the sequence information, the layer encryption key for each layer, the layer ID associated with each layer encryption key, and the document encryption key for the document.

2. The method of claim 1, wherein the plurality of layers form a depth sequence based on depths of the layers where any layer that is completely contained in another layer is deemed deeper than the other layer, the depth sequence being ordered from shallower layers to deeper layers, wherein step (e) includes:

setting a sequence of the encryption keys or layer IDs to an initial sequence which corresponds to the depth sequence of the layers; and sequentially evaluating the layers according to the depth sequence while manipulating positions of the encryption keys or layer IDs in the sequence of the encryption keys or layer IDs, including, for each layer, and changing the position of the corresponding encryption key or layer ID in the sequence in response to a determination that the user has no access rights to the layer.

3. The method of claim 2, wherein the step of changing the position of the corresponding encryption key or layer ID in the sequence includes:

if the encryption key or layer ID is currently at the front of the sequence, moving it to the end of the sequence, and if the encryption key or layer ID is currently not at the front of the sequence, moving it to the front of the sequence.

4. The method of claim 1, wherein in step (b) the layer-level access control information for each layer further includes zero or more conditions specifying whether access to the layer is allowed;

wherein the plurality of layers form a depth sequence based on depths of the layers where any layer that is completely contained in another layer is deemed deeper than the other layer, the depth sequence being ordered from shallower layers to deeper layers, wherein step (e) includes:

setting a sequence of the encryption keys or layer IDs to an initial sequence which corresponds to the depth sequence of the layers; and sequentially evaluating the layers according to the depth sequence while manipulating positions of the encryption keys or layer IDs in the sequence of the encryption keys or layer IDs, including, for each layer, changing the position of the corresponding encryption key or layer ID in the sequence in response to a determination that the user has no access rights to the layer or some of the zero or more conditions are not satisfied.

5. The method of claim 4, wherein the step of changing the position of the corresponding encryption key or layer ID in the sequence includes:

if the encryption key or layer ID is currently at the front of the sequence, moving it to the end of the sequence, and if the encryption key or layer ID is currently not at the front of the sequence, moving it to the front of the sequence.

6. In a digital rights management system including a server connected to a client, an access authorization method executed by the client for processing an encrypted document for display, comprising:

(a) obtaining the document, the document having been encrypted with a document encryption key, the document containing a plurality of layers each containing defined content of the document, each layer having been encrypted by a layer encryption key and identified by a layer identification (ID), wherein for any layer that is completely contained in another layer, encrypted data of the contained layer and other content of the containing layer have been further encrypted to form encrypted data of the containing layer;

(b) transmitting a document access request to the server, which includes a user identification (ID) of a user and a document identification (ID) for the document;

(c) receiving from the server a reply containing sequence information that represents an ordered sequence of the layer encryption keys, a layer ID corresponding to each layer encryption key, and the document encryption key, wherein the ordered sequence contains one copy of the layer encryption key for each layer of the document and has been arranged in an order that is uniquely determined by access rights of the user to access each layer;

(d) decrypting the document using the document encryption key to generated decrypted document data which contains unencrypted document content and further contains encrypted data of one or more layers, the encrypted data of each such layer being associated with a tag containing the corresponding layer ID;

(e) decrypting some of the plurality of layers of the document using the ordered sequence of the layer encryption keys, wherein each layer encryption key in the order sequence is used once and only once according to the sequence to attempt to decrypt encrypted layers that are currently available for decryption, wherein data generated from each successfully decrypted layer contains unencrypted document content of that layer and further contains encrypted data of zero or more other layers, the encrypted data of each of the other layer being associated with a tag containing the corresponding layer ID, and wherein after all layer encryption keys in the order sequence are used once and only once, at least one of the layers remain encrypted; and (f) displaying the document based on decrypted data generated in steps (d) and (e), wherein document content of any of the layers that remain encrypted after step (e) is not displayed.

7. The method of claim 6, wherein step (f) includes, for each of the at least one of the layers that remain encrypted, leaving a blank space corresponding to the document content of that layer or displaying a mask in an area corresponding to the document content of that layer.

8. A computer program product comprising a computer usable non-transitory medium having a computer readable program code embedded therein for controlling a server of a digital rights management system, the server being connected to a client, the computer readable program code configured to:

(a) store a document encryption key and document-level access control information for each of a plurality of documents, the document-level access control information specifying whether each of a plurality of users has access rights to the document;

(b) store layer-level access control information for each document, the layer-level access control information including, for each of a plurality of layers defined for the document, a layer identification (ID), a document identification (ID) identifying the document, user permission information specifying whether each user has access rights to content of the layer, and a layer encryption key for the layer;

(c) receive, from the client, a document access request by a requesting user to access a requested document identified by a document ID;

(d) retrieve the layer-level access control information for the requested document;

(e) generate sequence information that represents an ordered sequence of the layer encryption keys or layer IDs, the ordered sequence containing one copy of the layer encryption key or layer ID for each layer and arranged in an order that is uniquely determined by the access rights of the requesting user to access each layer; and (f) transmit a second reply to the client which includes the sequence information, the layer encryption key for each layer, the layer ID associated with each layer encryption key, and the document encryption key for the document.

9. The computer program product of claim 8, wherein the plurality of layers form a depth sequence based on depths of the layers where any layer that is completely contained in another layer is deemed deeper than the other layer, the depth sequence being ordered from shallower layers to deeper layers, wherein step (e) includes:
setting a sequence of the encryption keys or layer IDs to an initial sequence which corresponds to the depth sequence of the layers; and
sequentially evaluating the layers according to the depth sequence while manipulating positions of the encryption keys or layer IDs in the sequence of the encryption keys or layer IDs, including, for each layer,
and changing the position of the corresponding encryption key or layer ID in the sequence in response to a determination that the user has no access rights to the layer.

10. The computer program product of claim 9, wherein the step of changing the position of the corresponding encryption key or layer ID in the sequence includes:
if the encryption key or layer ID is currently at the front of the sequence, moving it to the end of the sequence, and
if the encryption key or layer ID is currently not at the front of the sequence, moving it to the front of the sequence.

11. The computer program product of claim 8, wherein in step (b) the layer-level access control information for each layer further includes zero or more conditions specifying whether access to the layer is allowed;
wherein the plurality of layers form a depth sequence based on depths of the layers where any layer that is completely contained in another layer is deemed deeper than the other layer, the depth sequence being ordered from shallower layers to deeper layers,
wherein step (e) includes:
setting a sequence of the encryption keys or layer IDs to an initial sequence which corresponds to the depth sequence of the layers; and
sequentially evaluating the layers according to the depth sequence while manipulating positions of the encryption keys or layer IDs in the sequence of the encryption keys or layer IDs, including, for each layer,
changing the position of the corresponding encryption key or layer ID in the sequence in response to a determination that the user has no access rights to the layer or some of the zero or more conditions are not satisfied.

12. The computer program product of claim 11, wherein the step of changing the position of the corresponding encryption key or layer ID in the sequence includes:
if the encryption key or layer ID is currently at the front of the sequence, moving it to the end of the sequence, and
if the encryption key or layer ID is currently not at the front of the sequence, moving it to the front of the sequence.

13. A computer program product comprising a computer usable non-transitory medium having a computer readable program code embedded therein for controlling a client of a digital rights management system, the client being connected to a server, the computer readable program code configured to:

(a) obtain the document, the document having been encrypted with a document encryption key, the document containing a plurality of layers each containing defined content of the document, each layer having been encrypted by a layer encryption key and identified by a layer identification (ID), wherein for any layer that is completely contained in another layer, encrypted data of the contained layer and other content of the containing layer have been further encrypted to form encrypted data of the containing layer;

(b) transmit a document access request to the server, which includes a user identification (ID) of a user and a document identification (ID) for the document;

(c) receive from the server a reply containing sequence information that represents an ordered sequence of the layer encryption keys, a layer ID corresponding to each layer encryption key, and the document encryption key, wherein the ordered sequence contains one copy of the layer encryption key for each layer of the document and has been arranged in an order that is uniquely determined by access rights of the user to access each layer;

(d) decrypt the document using the document encryption key to generated decrypted document data which contains unencrypted document content and further contains encrypted data of one or more layers, the encrypted data of each such layer being associated with a tag containing the corresponding layer ID;

(e) decrypt some of the plurality of layers of the document using the ordered sequence of the layer encryption keys, wherein each layer encryption key in the order sequence is used once and only once according to the sequence to attempt to decrypt encrypted layers that are currently available for decryption,
wherein data generated from each successfully decrypted layer contains unencrypted document content of that layer and further contains encrypted data of zero or more other layers, the encrypted data of each of the other layer being associated with a tag containing the corresponding layer ID, and
wherein after all layer encryption keys in the order sequence are used once and only once, at least one of the layers remain encrypted; and (f) display the document based on decrypted data generated in steps (d) and (e), wherein document content of any of the layers that remain encrypted after step (e) is not displayed.

14. The computer program product of claim 13, wherein step (f) includes, for each of the at least one of the layers that remain encrypted, leaving a blank space corresponding to the document content of that layer or displaying a mask in an area corresponding to the document content of that layer.

* * * * *